May 30, 1967  P. L. McWHORTER ETAL  3,322,710
PROCESS FOR PREPARING UNIFORM DISPERSIONS OF
FIBRILLATED POLYTETRAFLUOROETHYLENE
PARTICLES IN A THERMOSETTING RESIN
Filed July 20, 1964

INVENTORS
PURNAL McWHORTER
ROBERT S. MERCER
DAVID C. TRIMBLE
BY
Cushman, Darby & Cushman
ATTORNEYS United States Patent Office 3,322,710
Patented May 30, 1967

3,322,710
PROCESS FOR PREPARING UNIFORM DISPERSIONS OF FIBRILLATED POLYTETRAFLUOROETHYLENE PARTICLES IN A THERMOSETTING RESIN
Purnal L. McWhorter, Odessa, Robert S. Mercer, Newark, and David C. Trimble, Yorklyn, Del., assignors, by mesne assignments, to Haveg Industries, Inc., a wholly-owned subsidiary of Hercules Powder Company, New Castle, Del., a corporation of Delaware
Filed July 20, 1964, Ser. No. 384,289
9 Claims. (Cl. 260—29.2)

This invention relates to polytetrafluorethylene and articles manufactured therefrom. More particularly, the invention relates to a process of producing polytetrafluoroethylene in fibrous or elongated form in the presence of phenolic resin.

Several methods have, heretofore, been proposed for fibrillating polytetrafluoroethylene. Some of these methods have employed a rolling or grinding medium such as an organopolysiloxane, but these methods employing as they do grinders, extruders and differential rollers do not form a fibrous polytetrafluoroethylene by a simple kneading action in the presence of a second curable thermosetting resin, which second resin subsequently serves as the matrix for the ultimate product fabricated from the polytetrafluoroethylene containing composition.

For instance, in United States Patent No. 2,934,515 there is disclosed milling an organopolysiloxane gum mixed with solid polytetrafluoroethylene on a standard two roll rubber compounding mill. The shearing action of the mill causes the polytetrafluoroethylene particles to deform and elongate, thus forming fibers in the gum. Again, in United States Patent No. 2,719,833, coarse grains of polytetrafluoroethylene are mixed with a binder such as thermoplastic, viscous, sticky substances worked on a mill as described above, the working producing a substantial diminution of the size of the polytetrafluoroethylene particles in a resulting plastic sheet. In United States Patent No. 2,710,290 elongation or fibrillation of polytetrafluoroethylene in an organopolysiloxane is accomplished by the use of differential rolls, or by the use of an extrusion machine employing a worm gear. Other extrusion machines are used in United States Patent No. 2,915,786 to form long fibers having an improved transverse strength. Again, by extrusion, rolling or calendering, fibrillation of polytetrafluoroethylene with silica, aluminum powder and mica can be accomplished with allegedly increased transverse strength of the extruded material being achieved with subsequent sintering of the formed shapes according to United States Patent No. 2,961,712.

Fibrous polytetrafluoroethylene has also been achieved in yet another manner as disclosed in United States Patent No. 2,728,698 wherein previously sintered bodies of polytetrafluoroethylene are subjected to grinding wheels, sanding belts or mechanical elements effecting a filing action against the body, to remove small particles which expose small fibrous areas.

According to United States Patent No. 2,936,301, pulverization of ordinary raw finely divided polytetrafluoroethylene produces a fibrous material as a result of collision, abrasion and other disruptive forces present in an enclosed bladed rotor using a vortex of air or other gaseous medium.

Yet another method disclosed is that appearing in United States Patent No. 3,027,601 wherein scraps of unsintered oriented polytetrafluoroethylene are cut as by a disc grinder, then shredded to attain a characteristic fibrillous appearance.

The above methods of reducing polytetrafluoroethylene to a fibrous form have certain disadvantages especially when it is desired to retain the shreds or fibers of polytetrafluoroethylene in a matrix for further processing such as molding. Thus a considerable saving of expenditures for time and equipment in removing the polytetrafluoroethylene fibers from a grinding medium, washing the fibers, sintering them and recompounding them in a suitable matrix can be effected by the instant invention.

Further, the instant invention does not require the use of expensive equipment such as grinders, extrusion machines and differential rolls. As a result, the expense required to control, for instance, the pressure of differential rollers so as not to fracture or destroy fibers formed thereon is essentially eliminated.

It is therefore an object of the present invention to fibrillate polytetrafluoroethylene in the presence of a phenolic resin in a manner which overcomes the above disadvantages.

It is another object of the present invention to fibrillate polytetrafluoroethylene in the presence of a phenolic resin whereby said fibrillated polytetrafluoroethylene is uniformly dispersed within the phenolic resin matrix.

An additional object of the present invention is to provide an improved fibrous polytetrafluoroethylene phenolic resin composition suitable for bearings and bushings.

A further object of the present invention is to provide a fibrous polytetrafluoroethylene phenolic resin composition suitable as a molding composition.

Still further objects and the entire scope of applicability of the present invention will become apparent from the detailed description given hereinafter; it should be understood, however, that the detailed description and specific examples, while indicating preferred embodiments of the invention, are given by way of illustration only, since various other changes and modifications within the spirit and scope of the invention will become apparent to those skilled in the art from this detailed description.

It has now been found that these objects can be attained by mixing an aqueous dispersion of a phenolic resin with an aqueous dispersion of polytetrafluoroethylene and agitating the mixture to fibrillate the polytetrafluoroethylene in the phenolic resin matrix.

In the specification and claims, unless otherwise stated, all percentages and parts are by weight.

The invention will be best understood in connection with the accompanying drawings, wherein.

Figure 1:
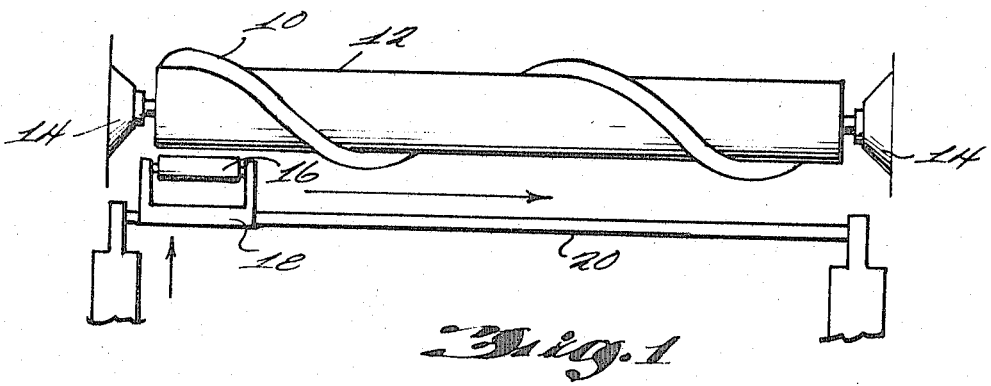
FIGURE 1 is a top elevation showing an initial stage in a method for forming a bearing.

The aqueous dispersion of polytetrafluoroethylene useful for the process of the present invention contains preferably between about 10 and 85% by weight of polytetrafluoroethylene particles which can vary in size from 0.05 to 0.5 micron or greater average diameter. The shape of these particles is of little importance and a commercial polytetrafluoroethylene dispersion can easily be used as starting material for the production of a composition according to the instant invention. An aqueous polytetrafluoroethylene dispersion such as marketed by Du Pont under the trade name of Teflon 30B is readily used as the starting material. This aqueous dispersion comprises about 60.5% by weight of polytetrafluoroethylene particles and about 6% by weight of Triton X-100, a nonionic dispersing agent which is the reaction product of about 10 moles of ethylene oxide with 1 mole of paraoctyl phenol. The aqueous dispersion, however, can be produced by other conventional procedures as described in the United States Patents Nos. 2,478,229 and 2,559,752. Additionally, as a dispersing agent any conventional dispersing agent can be employed, e.g. non-ionic dispersing agents such as alkylaryl polyether alcohols, e.g. octylphenolethylene oxide adducts and nonylphenol ethylene oxide adducts, sorbitan sesquioleate, polyoxyethylated sorbitan oleate laurate, polyoxyalkylated stearate and ethylene oxide-propylene oxide adduct; or anionic dispersing agents such as dioctyl sodium sulfosuccinate, sodium dodecyl benzene sulfonate and other alkali metal salts of alkarylsulfonic acids, sodium lauryl sulfate, sodium cetyl sulfate and sodium lignin sulfonate. The preferred dispersing agents are those present in commercially available polytetrafluoroethylene dispersions. Usually ammonium perfluorocaprylate, and ionic dispersing agent, is used in preparing such dispersion and Triton X–100, a non-ionic ingredient, is added subsequently to the dispersion to keep particles suspended. The dispersing agent is generally provided in amounts from about 2 to 20% by weight of the dispersion and the particular amount used will depend on a number of factors easily determined by those skilled in the art. Thus, the amount will vary, for instance, according to the amount of dispersed polytetrafluoroethylene or the particular dispersing agent chosen.

The preferred resin is a phenol formaldehyde resin such as Haveg 41P. Other thermosetting resins which can be used include thermosetting resins such as phenolics, furane resin, e.g. phenol-furfural, cresylic acid formaldehyde, m-cresol formaldehyde, furfuryl alcohol resins, furfuryl alcohol-formaldehyde resin (80:20), melamine formaldehyde, urea formaldehyde resin (85:15), etc. An aqueous dispersion, suspension or solution of the phenolic or other resin employed usually has a solids content of 50 to 90%, preferably, 60 to 85% based on the total weight of the aqueous phenolic resin. Commercially available aqueous-phenol formaldehyde resin dispersions can be employed.

The phenol-formaldehyde resin is desirably in the A stage and 5 to 30% of water usually will dissolve in this resin although higher amounts of water can be dissolved.

With an aqueous thermosetting resin, e.g., phenol formaldehyde as described above, there is mixed an aqueous suspension of polytetrafluoroethylene. The mixing action produces a fine uniform dispersion of polytetrafluoroethylene in the aqueous thermosetting resin. The mixture is then agitated, providing a kneading action which produces a fibrillated polytetrafluoroethylene within the phenolic or other resin matrix. The initial mixture generally contains 40 to 95 weight percent aqueous thermosetting resin, e.g., phenol formaldehyde, preferably, 50 to 85 weight percent, the balance being essentially the aqueous solution, dispersion or suspension of polytetrafluoroethylene containing 10 to 85% of the polytetrafluoroethylene. However, the mixture can also contain conventional fillers, coloring agents, driers, and the like.

In place of polytetrafluoroethylene there can be used other perfluorocarbon polymers such as polyhexafluoropropylene and tetrafluoroethylene hexafluoropropylene copolymer (e.g., 20:80).

Having described the present invention in general terms, the following examples demonstate specific embodiments.

In the specification and claims, unless otherwise stated, all percentages and parts are by weight.

Example 1

104 lbs. of phenol and 109 lbs. of 37% aqueous formaldehyde were placed in a vessel. This mixture was heated by steam until the temperature reached 100° F., 20 lbs. of water were added to the vessel and heating continued and when the temperature reached 150° F., a mixture of 790 grams sodium hydroxide and 4000 cc. of water were added. The mixture was heated slowly until the reaction started at about 175° F. Then the steam was turned off until the reaction became less violent. The temperature was then maintained between 200° F., and 215° F. for 90 minutes after refluxing began. The steam pressure was not allowed to exceed 3 lbs./sq. in. (gauge). At the end of the 90-minute period, the steam was released and cooling water turned on.

Example 2

To 200 grams of Haveg "P" grade phenolic resin, an aqueous dispersion of phenol formaldehyde resin prepared essentially as outlined in Example 1 and containing 17 weight percent water, there was stirred 200 grams of Teflon 30B an aqueous polytetrafluoroethylene dispersion containing 60.5% weight solids and 6% of Triton X–100 as a dispersing agent. This mixing action resulted in a fine, uniform dispersion of minute Teflon particles throughout the phenolic resin. Continued stirring of the phenolic resin containing finely dispersed polytetrafluoroethylene thickened the mixture and a small amount of water was released. The resulting phenolic resin containing a fine uniform dispersion of fibrous polytetrafluoroethylene was introduced into a bearing mold and heated in an autoclave to complete the polymerization at a pressure of about 110 p.s.i. gauge. The temperature was raised over a period of about an hour to 275° F. The present temperature was maintained at 275° F. for a little over an hour and then was reduced to 240° F. over 15 minutes, during the subsequent period while the exotherm was occurring within the piece. Following the subsidence of the exotherm, the temperature was raised at an orderly rate to the curing level of 275° F. The period of reduced temperature and gradual rise took about 5½ hours. Curing was then completed at 275° F. for 4 hours. The pressure was released and the solid, cured bearing was released from the mold. With phenolic resins of ¼ inch to 2½ inches, the preheat temperature of the air in the autoclave is usually between 270° F. and 275° F. The temperature is then dropped 30 to 35° F. to 240° F. during exothermic temperature peak period and then is raised to between 270° F. and 280° F. for final cure. The resulting bearing can then be machined to any desired dimensions.

Example 3

To 1000 grams of furfuryl alcohol formaldehyde resin containing 15 weight percent water was added as catalyst 15 grams of p-toluene sulfonyl chloride by thoroughly stirring in the finely powdered catalyst. To this mixture was added 500 grams of Teflon 30B (an aqueous dispersion containing 60.5% weight polytetrafluoroethylene solids and 6% of Triton X–100 as a dispersing agent). The resultant mixture after being stirred until sufficient thickening had occurred as a result of the fibrillation of the polytetrafluoroethylene particles was fabricated and cured essentially according to the procedures outlined in Example 2.

By the present invention the amount of polytetrafluoroethylene can be from 0.6% to 72% by weight of the final dry mix. The procedure of the invention fibrillates the polytetrafluoroethylene particles and elongates them.

The bushing or bearing material of this invention can also be formed into the final product by a method disclosed for instance in U.S. application Ser. No. 296,207, filed July 19, 1963. As shown in FIGURE 1, a mixture of phenol formaldehyde resin and fibrillated polytetrafluoroethylene 10 is applied to the outer side of a steel tube or mandrel 12 which is connected to lathes 14. The mandrel is rotated or spun at a speed of 100 r.p.m. with the aid of a motor (not shown). Idle roller 16 on tool rest 18 is then brought into contact with the doughy mass 10 which is squeezed between the idle roller and the rotating mandrel. The idle roller is moved along bar 20 back and forth during the process of shaping the composition into a form suitable for a bearing. Thus the mixture is built up to a depth of, preferably, 9/16 inch to 5/8 inch and the operation which takes about 45 minutes results in a deeper and more nearly complete fiber orientation.

The resultant formed mixture while still on the mandrel is heated in an autoclave to complete the polymerization, the autoclave conditions being essentially the same as those outlined above. The pressure subsequently is released and the mandrel is then withdrawn from the solid, cured tubular object, i.e., the bearing or bushing material 22.

Figure 2:
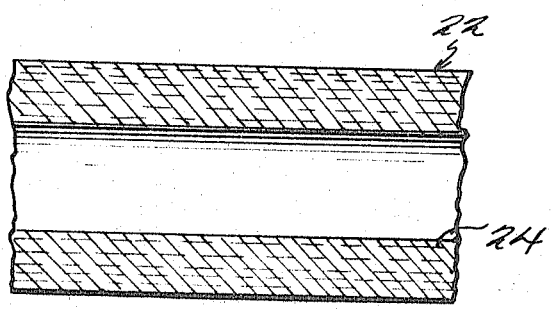
FIGURE 2 is a sectional view of the bearing made in accordance with the method shown in FIGURE 1.
Figure 3:
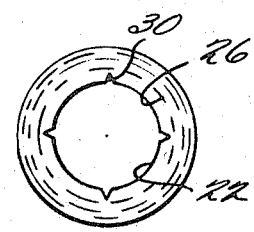
FIGURE 3 is an end view of the bearing composition after grooving procedures.
Figure 4:
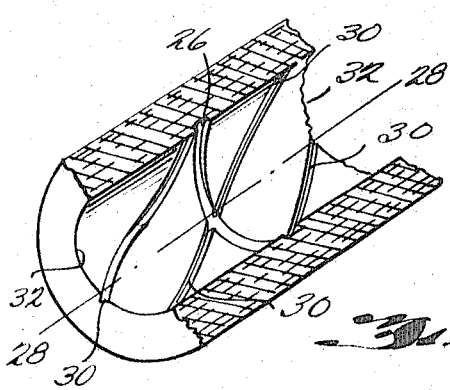
FIGURE 4 is a perspective view in section of an embodiment of the invention.

Subsequent to the formation of the tubular bearing material, it is cut into portions measuring 1½ inches axial length essentially as shown in FIGURE 2. It is then machined to reduce its outside diameter to 1.5 inches. In the inside peripheral surface 24 of the bearing 22 there is cut a central groove 26 normal to the longitudinal axis 28 of the bearing, approximately 3/32 inch deep and 1/16 inch wide. Thereafter, four V-shaped grooves 30 having substantially the same dimensions as the central groove 26 are cut at an angle of about 45° to the central groove, extending to the outside edges 32 of the bearing 22 as more clearly shown in FIGURES 3 and 4.

While the invention has been illustrated and described in certain preferred embodiments, the same is not to be limited to the details described, except as defined in appended claims.

What is claimed is:

1. A process for preparing a uniform dispersion of fibrous solid polytetrafluoroethylene in a thermosetting resin selected from the group consisting of phenol formaldehyde resin and furfuryl alcohol-formaldehyde resin comprising mixing an aqueous dispersion of polytetrafluoroethylene polymer particles with an aqueous dispersion of said thermosetting resin to produce a uniform dispersion of said polytetrafluoroethylene particles in said thermosetting resin, thickening said mixture, releasing water therefrom and fibrillating said polytetrafluoroethylene particles by agitating said mixture.

2. The process of claim 1 wherein the thermosetting resin is A stage phenol formaldehyde resin.

3. The process according to claim 2 wherein the aqueous dispersion of polytetrafluoroethylene contains 10 to 85 weight percent polytetrafluoroethylene particles.

4. The process according to claim 2 wherein the aqueous dispersion of said thermosetting resin contains 50 to 97 weight percent solids.

5. The process according to claim 1 wherein the aqueous dispersion of polytetrafluoroethylene is present in amounts of 10 to 75 weight percent of said mixture the balance being essentially said aqueous dispersion of said thermosetting resin.

6. A polytetrafluoroethylene molding composition comprising a thermosetting resin selected from the group consisting of phenol formaldehyde resins and furfuryl alcohol-formaldehyde resins and polytetrafluoroethylene fibrillated in said thermosetting resin by the process of claim 1.

7. The composition of claim 6 wherein the thermosetting resin is a phenol formaldehyde resin.

8. The composition of claim 6 wherein the thermosetting resin is a furfuryl alcohol-formaldehyde resin.

9. A bearing comprising a thermosetting resin selected from the group consisting of phenol-formaldehyde resin and furfuryl alcohol-formaldehyde resin, having uniformly dispersed therein polytetrafluoroethylene fibrillated according to the process of claim 1.

References Cited
UNITED STATES PATENTS

| | | | |
|---|---|---|---|
| 2,343,972 | 3/1944 | Harvey | 260—829 |
| 2,757,109 | 7/1956 | Martello | 260—29.3 |
| 2,825,706 | 3/1958 | Sanders | 260—29.3 |
| 2,934,515 | 4/1960 | Konkle et al. | 260—46.5 |
| 2,976,257 | 3/1961 | Dawe et al. | 260—29.6 |
| 2,999,788 | 9/1961 | Morgan | 162—157 |
| 3,114,672 | 12/1963 | Schott | 162—157 |

MURRAY TILLMAN, *Primary Examiner.*

J. C. BLEUTGE, *Assistant Examiner.*